United States Patent
Barnes et al.

(10) Patent No.: US 12,038,327 B2
(45) Date of Patent: Jul. 16, 2024

(54) COLORIMETER COLOUR STANDARDS

(71) Applicant: TINTOMETER GMBH, Dortmund (DE)

(72) Inventors: Nicholas Jeremy Barnes, Salisbury (GB); Amy Elizabeth Penn, Amesbury (GB); Peter John Clarke, Salisbury (GB)

(73) Assignee: TINTOMETER GMBH (DE)

( * ) Notice: Subject to any disclaimer, the term of this patent is extended or adjusted under 35 U.S.C. 154(b) by 318 days.

(21) Appl. No.: 17/615,538

(22) PCT Filed: Jul. 17, 2020

(86) PCT No.: PCT/EP2020/070315
§ 371 (c)(1),
(2) Date: Nov. 30, 2021

(87) PCT Pub. No.: WO2021/013737
PCT Pub. Date: Jan. 28, 2021

(65) Prior Publication Data
US 2022/0228912 A1   Jul. 21, 2022

(30) Foreign Application Priority Data
Jul. 19, 2019  (EP) ..................... 19187335

(51) Int. Cl.
*G01J 3/50*  (2006.01)
*G01J 3/02*  (2006.01)
*G01J 3/52*  (2006.01)

(52) U.S. Cl.
CPC ............. *G01J 3/501* (2013.01); *G01J 3/0202* (2013.01); *G01J 3/522* (2013.01)

(58) Field of Classification Search
CPC ........... G01J 3/0202; G01J 3/501; G01J 3/522
See application file for complete search history.

(56) References Cited

U.S. PATENT DOCUMENTS

| | | |
|---|---|---|
| 2,172,352 A | 9/1939 | Allison |
| 2,774,276 A | 12/1956 | Glasser et al. |
| 3,520,626 A | 7/1970 | Hach |

(Continued)

FOREIGN PATENT DOCUMENTS

| | | |
|---|---|---|
| CN | 2140061 Y | 8/1993 |
| CN | 2798091 Y | 7/2006 |

(Continued)

OTHER PUBLICATIONS

International Search Report issued in International Patent Application No. PCT/EP2020/070315 on Aug. 14, 2020. 3 pages.

*Primary Examiner* — Michael A Lyons
(74) *Attorney, Agent, or Firm* — Dilworth IP, LLC

(57) ABSTRACT

A method of making a colorimeter colour standard, including determining print parameters required to achieve a desired colour for the colour standard, printing the desired colour on a colour-receiving face of a first transparent piece using the determined print parameters and permanently affixing the printed first piece to a second transparent piece such that the colour-receiving face of the first transparent piece and a joining face of the second transparent piece are positioned at the interface between the first transparent piece and the second transparent piece.

16 Claims, 10 Drawing Sheets

(56) References Cited

U.S. PATENT DOCUMENTS

| | | |
|---|---|---|
| 4,666,757 A | 5/1987 | Helinski |
| 4,965,242 A | 10/1990 | Deboer et al. |
| 6,899,775 B2 | 5/2005 | Hill et al. |
| 7,014,910 B2 | 3/2006 | Rochford et al. |
| 8,482,797 B2 | 7/2013 | Mahy et al. |
| 9,981,485 B2 | 5/2018 | Ikeda et al. |
| 2004/0045931 A1 | 3/2004 | Hill et al. |
| 2006/0215162 A1 | 9/2006 | Shannon et al. |
| 2008/0079965 A1 | 4/2008 | Jackson |
| 2010/0051165 A1 | 3/2010 | Tombs et al. |
| 2010/0316853 A1 | 12/2010 | Kuhlenschmidt et al. |
| 2011/0310415 A1 | 12/2011 | Mahy et al. |
| 2014/0218434 A1 | 8/2014 | Kosuge |
| 2016/0041034 A1* | 2/2016 | Nakai .................. G01J 3/0205 356/326 |
| 2016/0234402 A1* | 8/2016 | Yamaguchi ............ H04N 1/603 |
| 2017/0050449 A1 | 2/2017 | Ikeda et al. |

FOREIGN PATENT DOCUMENTS

| | | | | |
|---|---|---|---|---|
| CN | 102342087 A | | 2/2012 | |
| DE | 102016205779 A1 | | 6/2016 | |
| EP | 0233316 A2 | | 8/1987 | |
| EP | 2540512 A1 | | 2/2013 | |
| JP | 2000088652 A | | 3/2000 | |
| JP | 2015214133 A | | 12/2015 | |
| JP | 2017053805 A | * | 3/2017 | ........... H04N 1/6044 |

\* cited by examiner

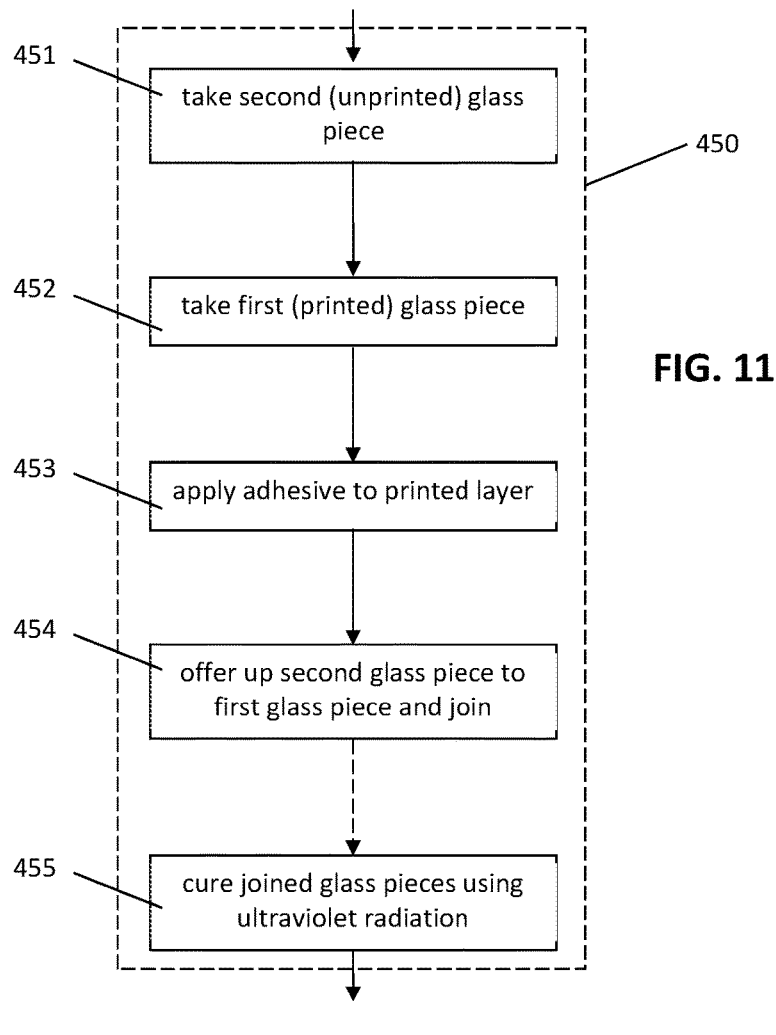
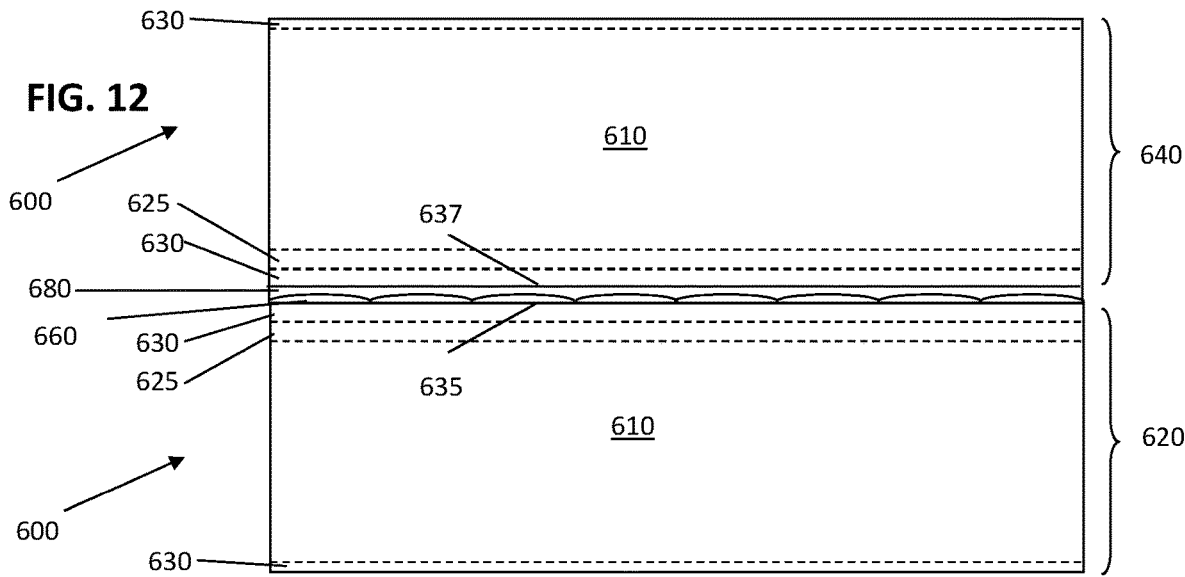

COLORIMETER COLOUR STANDARDS

FIELD OF THE INVENTION

The present invention relates to colour standards used in colorimeters, for example colour standards that may be used in a colour comparator disc. In particular, the present invention relates to methods of making colour standards.

BACKGROUND TO THE INVENTION

A colorimeter is a device for colour grading where the colour of a sample, and hence the sample itself, is graded relative to a set of known standard (or reference) colours of a colour scale. Examples of one dimensional industry specific colour scales include the ASTM colour scales (used commonly in the grading of petroleum products, e.g. ASTM D 1500, ISO 2049 and IP 196), the EBC scale (European Brewing Scale used for grading beers, malts, caramel solutions and other similarly coloured liquids), the European Pharmacopoeia colour scale, the Gardner Colour scale (used for grading similarly coloured liquids such as resins, varnishes, lacquers, drying oils, fatty acids, lecithins, sunflower oil and linseed oil), the Platinum-Cobalt/Hazen/APHA colour scale (used for grading clear to dark amber liquids, for example in the water industry and also for industries relating to clear oils, chemicals and petro-chemicals such as glycerine, plasticisers, solvents, carbon tetrachloride and petroleum spirits), the Saybolt colour scale (used for grading light coloured petroleum products including aviation fuels, kerosene, napthas, white mineral oils, hydrocarbon solvents and petroleum waxes), the DEHA colour scale (used in boiler water analysis to determine the concentration of DEHA (diethylhexyl adipate) available for corrosion inhibiting in the boiler system,) and white and yellow indices (used to grade whiteness and yellowness, for example in the paint and paper industries).

A typical colorimeter is shown in FIG. 1. This colorimeter has a holder indicated at A that receives a liquid sample to be graded. The liquid sample, contained in a transparent holder, is viewed through a window (shown at B) alongside a colour standard provided by a comparator disc (shown at C) that presents a series of colour standards from a colour scale. Each colour standard comprises a piece of stained glass of the desired colour from the colour scale. The colour comparator disc is circular and the colour standards are arranged around the edge of the disc. The colour standards are placed in order according to the colour scale. The colour comparator disc is rotated to present in turn each colour standard to the viewing window while the sample may also be viewed through the viewing window. A user may then see which colour in the colour scale is best matched to the sample, thereby grading the sample.

Traditionally, colour standards are glass pieces, with each glass piece corresponding to a piece of differently-coloured stained glass. Producing stained glass is an inexact process for obtaining a precise colour. There are many factors influencing the glass making process that may affect, for example, the chemical reactions of the colouring agents added to produce a desired colour of glass. Therefore it is very difficult to achieve a particular colour precisely and to avoid inconsistencies in the colour of the glass in standards of this type.

Colour standards made in this way must be measured against master colour standards to determine how much they deviate from the desired colour. Once this deviation is known, one or more other colour standards are compounded (i.e. joined, for example using adhesive) to correct for the deviation. This produces a colour standard that comprises of a stack of differently-coloured glass pieces that together produce the desired colour.

Notwithstanding the difficulties in making stained glass colour standards, such colour standards enjoy vast longevity in that they will maintain their colours for tens or even hundreds of years.

SUMMARY OF THE INVENTION

Against this background, and from a first aspect, the present invention resides in a method of making a colorimeter colour standard. The method comprises determining print parameters required to achieve a desired colour for the colour standard, and printing the desired colour on a colour-receiving face of a first transparent piece using the determined print parameters.

The first transparent piece may comprise or consist of glass. Alternatively, the first transparent piece may comprise or consist of a plastic such as acrylic. Preferably, the first transparent piece is clear, i.e. uncoloured or not tinted, prior to the step of printing. The first transparent piece may be a flat piece with flat, opposed faces and with the colour-receiving face corresponding to one of the flat, opposed faces. For example, the first transparent piece may be a flat circular disc.

The method may comprise printing the desired colour on the colour-receiving face of the first transparent piece using the determined print parameters to cover all of the colour-receiving face. Alternatively, the method may comprise printing the desired colour on the colour-receiving face of the first transparent piece using the determined print parameters to cover only a portion of the colour-receiving face (such as to provide a spot of the desired colour on the colour-receiving face).

It has been found that better colour control may be obtained using the proposed printing method. For example, printing techniques such as using a digital printer or screen printing allows accurate reproduction of colours. This results in colour standards that match the desired colour without requiring further colour correction as was described with respect to the prior art method of using stained glass colour standards.

The method further comprises, after printing the desired colour on a colour-receiving face, permanently affixing the first transparent piece to a second transparent piece such that the colour-receiving face of the first transparent piece and a joining face of the second piece are positioned at the interface between the first piece and the second piece.

The second transparent piece may comprise or consist of glass. Alternatively, the second transparent piece may comprise or consist of a plastic such as acrylic. Preferably, the second transparent piece is clear, i.e. uncoloured or not tinted. The second transparent piece may be a flat piece with flat, opposed faces and with the joining face corresponding to one of the flat, opposed faces. For example, the second transparent piece may be a flat circular disc. The second transparent piece may match the first transparent piece prior to the printing step. The first and second transparent pieces may match in size and shape such that they may be stacked on top of each other to form the colour standard, wherein the colour standard has the same length and width as each transparent piece, but around twice the thickness of each transparent piece.

The first transparent piece is permanently affixed to the second transparent piece to the extent that accidental separation of the first and second transparent pieces is prevented, for example such that the first transparent piece requires forcible separation from the second transparent piece rather than allowing the two pieces to be merely pulled apart by hand.

Advantageously, permanently affixing the first transparent piece to the second transparent piece with the colour-receiving face positioned at the interface between the first and second transparent pieces provides protection for the printed colour on the colour-receiving face of the first transparent piece. This helps stop the printed colour from being scratched or scraped as it is protected within the colour standard.

It has been realised that longevity of the colorimeter colour standards may be achieved that are adequate for the purposes of most colorimeter applications. As noted above, colour standards made using stained glass will maintain their colour for tens or hundreds of years. However, such longevity is not required for most applications. In fact, most colour standards are lost or damaged (e.g. scratched or broken) long before the colour of the standard starts to fade. It has also been appreciated that while the longevity of the printed colour standard is adequate for short term applications (for example in the order of six months), the longevity may be increased significantly by providing protection against degradation of the printed colour due to exposure to ultraviolet radiation.

Accordingly, at least one of the first and second transparent pieces may comprise an ultraviolet coating (or treatment) that protects against ultraviolet degradation. For example, a coating may be applied to a face of the first transparent piece. After coating, the first transparent piece may then be heated or baked such that the coating is absorbed or fuses with the material (e.g. glass) of the underlying surface. Optionally, the colour-receiving face of the first transparent piece comprises the ultraviolet coating. The coating step may be performed prior to the printing step, such that the desired colour is printed onto the colour-receiving face that comprises the ultraviolet coating. The ultraviolet coating may cover all of the colour-receiving face, or at least the entire portion of the colour-receiving face onto which the desired colour is printed or is to be printed. Providing the ultraviolet coating on the colour-receiving face is advantageous when this colour-receiving face is internally located in the finished colour standard: if the ultraviolet coating is provided on a reverse side of the first transparent piece, it may then reside on an external face of the colour standard where it may be scratched or otherwise damaged.

Alternatively, the second transparent piece may be treated in the any of the ways described in the preceding paragraph such that it comprises an ultraviolet coating (or treatment). This ultraviolet coating may be provided on the joining face of the second transparent piece.

However, it is preferred but optional that both the first and second transparent pieces are treated in any of the ways described in the preceding two paragraphs such that they both comprise ultraviolet coatings (or treatments). Hence, the colour-receiving face of the first transparent piece may comprise an ultraviolet coating that protects against ultraviolet degradation and the desired colour may be printed onto the colour-receiving face comprising the ultraviolet coating. Also, the joining face of the second transparent piece may comprise an ultraviolet coating that protects against ultraviolet degradation. This is advantageous as the printed colour may then be sandwiched between two ultraviolet coatings, such that it is protected from degradation from ultraviolet irradiation from both sides, and such that both coatings are located internally and so protected from damage. It has been found that providing protection against ultraviolet degradation in this way results in colour standards that may last tens of years without fading, which is long enough for most colorimeter applications.

Optionally, the step of determining print parameters required to achieve a desired colour for the standard comprises determining the printer settings of a digital printer to achieve the desired colour, and the step of printing the desired colour on the colour-receiving face of the first transparent piece comprises operating the digital printer according to the determined printer settings. As used herein, the term "digital printer" means a printer controlled using a digital file, e.g. a flatbed computer-controlled printer.

Determining the printer settings of a digital printer may comprise obtaining colour co-ordinates of the desired colour in a colour scale. For example, the colour co-ordinates may be expressed in RGB or another colour scale such as L*a*b. The colour co-ordinates may be obtained through measurement, for example using a spectrometer to measure a reference colour or by using a look-up table or similar that provides an illustration of a colour alongside the corresponding colour co-ordinates. Where the colour co-ordinates are not expressed as CMYK or other printer co-ordinates, the method may then comprise converting the colour co-ordinates into the equivalent CMYK or other printer colour co-ordinates. The method may then comprise using the CMYK or other printer colour co-ordinates to determine the relative amounts of cyan, magenta, yellow and black or other colour inks to use in the step of printing the desired colour on the colour-receiving face of the first transparent piece. For example, these relative amounts of cyan, magenta, yellow and black or other colour inks may be mixed in the digital printer prior to being dispensed through a print head of the digital printer.

Determining the printer settings of a digital printer may also comprise determining one or more, but not limited to, of the following printer settings required to achieve the desired colour: ink drop size; separation distance of the printer head from the colour-receiving face of the first slide; and number of passes of the printer head over the colour-receiving face of the first slide. These printer settings may be obtained from a look-up table that lists the recommended printer settings for each of a range of colours. The look-up table may be populated using empirical measurement (i.e. varying settings to achieve a desired colour and recording the settings that produce the best match to the desired colour).

Determining the printer settings of a digital printer may also comprise producing an output file for use by the digital printer that includes the determined printer settings, for example the relative amounts of cyan, magenta, yellow and black or other colour inks; the ink drop size; the separation distance of the printer head from the colour-receiving face of the first transparent piece; and the number of passes of the printer head over the colour-receiving face of the first transparent piece.

Optionally, printing the desired colour on the colour-receiving face of the first transparent piece comprises printing an ultraviolet curable ink, and the method further comprises using ultraviolet radiation to cure the printed ink. The ink may be cured after each pass of the printer head or the ink may be cured only after all passes of the printer head are complete. The ultraviolet radiation is best provided from the print receiving face side of the first transparent piece so that it does not get attenuated by the ultraviolet coating (or treatment).

Optionally, after the ink has been cured and/or has dried, the method may comprise using the digital printer to print a varnish or other protective coating to the colour-receiving face of the first transparent piece.

The step of permanently affixing the first transparent piece to a second transparent piece such that the colour-receiving face and the joining face are positioned at the interface between the first and second transparent pieces may comprise applying a liquid adhesive to the printed colour-receiving face of the first transparent piece, and then joining the colour-receiving face of the first transparent piece to the joining face of the second transparent piece. Using a liquid adhesive may be advantageous where the printing process leaves an uneven print layer on the colour-receiving face of the first transparent piece. For example, the liquid adhesive may be given enough time to flow over or settle over the printed layer so as to form a flat surface for offering up to the joining face of the second transparent piece. In addition or as an alternative, the method may comprise applying liquid adhesive to the joining face of the second transparent piece. Also, the method may comprise pressing the first and second transparent pieces together as the adhesive cures which will assist the adhesive in flowing into thinner sections of the printed layer.

Optionally, the adhesive is a clear adhesive, or at least is clear when cured.

The liquid adhesive may be an ultraviolet curable adhesive, and the method may further comprise using ultraviolet radiation to cure the adhesive. Preferably, the method comprises illuminating the adhesive with the ultraviolet radiation through the second transparent piece. This is advantageous as it reduces exposure of the printed colour to the ultraviolet radiation.

The first transparent piece and/or the second transparent piece may comprise an optical coating. Optionally, the colour-receiving face of the first transparent piece and/or the joining face of the second transparent piece comprise the optical coating such that the optical coating(s) end up in the middle of the colour standard, away from the external surfaces where they may otherwise be exposed to being damaged such as by scratching.

Optionally, the method further comprises determining the desired colour for the standard and determining the colour co-ordinates of the desired colour. For example, the method may comprise determining a reference colour scale to be used; determining which colour of the reference colour scale is to be reproduced in the colorimeter colour standard; and determining the colour co-ordinates of that colour as the colour co-ordinates of the desired colour.

The present invention also resides in a method of making multiple colorimeter colour standards, comprising the method of making a colorimeter colour standard as described in any of the preceding paragraphs and one or more further steps of determining print settings required to achieve a further desired colour, different to the other desired colour(s), and printing the further desired colour on a face of a transparent piece. This method may be implemented either (a) to produce a single joined part bearing multiple colour standards or (b) to produce multiple individual colour standards.

As an example of alternative (a), the method may comprise printing each further desired colour on an unprinted portion of the colour-receiving face of the first transparent piece, and then permanently affixing the printed first piece to the second transparent piece such that the colour-receiving face and the joining face are positioned at the interface between the first and second transparent pieces, thereby providing multiple colour standards on a single joined part. The printed colours may be evenly spaced apart and may have corresponding sizes. For example, the first and second transparent pieces may be circular or annular discs, and the multiple colours may be printed around the edge of the disc. When alternative (a) is followed, the present invention may then extend to a method of making a colorimeter comparator disc comprising this method of making a single joined part having multiple colour standards and mounting the single joined part in a holder.

As an example of alternative (b), the method may comprise printing each further desired colour on a colour-receiving face of a different transparent piece, and then permanently affixing each transparent piece after printing to another transparent piece (which has not been subjected to a printing step) such that the colour-receiving face and a joining face of the another transparent piece are positioned at the interface between the different transparent piece and the another transparent piece, thereby providing multiple colour standards. The individual colour standards may have the same size and shape. When alternative (b) is followed, the present invention may then extend to a method of making a colorimeter comparator disc comprising this method of making multiple colour standards and mounting the colour standards in a holder. The colour standards may be mounted to be evenly spaced.

Any of the colorimeter comparator discs described above may comprise colour standards having colours of a reference colour scale.

The present invention also resides in a colorimeter colour standard comprising a first transparent piece permanently affixed to a second transparent piece such that a colour-receiving face of the first transparent piece and a joining face of the second transparent piece are positioned at the interface between the first transparent piece and the second transparent piece, and wherein the colour-receiving face of the first transparent piece bears a desired colour. For example, a desired colour may have been printed on the colour-receiving face of the first transparent piece.

The first transparent piece may comprise or consist of glass. Alternatively, the first transparent piece may comprise or consist of a plastic such as acrylic. Preferably, the first transparent piece is clear, i.e. uncoloured or not tinted, prior to the step of printing. The first transparent piece may be a flat piece with flat, opposed faces and with the colour-receiving face corresponding to one of the flat, opposed faces. For example, the first transparent piece may be a flat circular disc. The desired colour may be printed on the colour-receiving face of the first transparent so as to cover all of the colour-receiving face. Alternatively, the desired colour may be printed on the colour-receiving face of the first transparent piece so as to cover only a portion of the colour-receiving face (such as to provide a spot of the desired colour on the colour-receiving face).

The second transparent piece may comprise or consist of glass. Alternatively, the second transparent piece may comprise or consist of a plastic such as acrylic. Preferably, the second transparent piece is clear, i.e. uncoloured or not tinted. The second transparent piece may be a flat piece with flat, opposed faces and with the joining face corresponding to one of the flat, opposed faces. For example, the second transparent piece may be a flat circular disc. The second transparent piece may correspond to an unprinted version of the first transparent piece. The first and second transparent pieces may match in size and shape such that the colour standard has the same length and width as each transparent piece, but around twice the thickness of each transparent piece.

The printed first transparent piece is permanently affixed to the second transparent piece to the extent that accidental separation of the first and second transparent pieces is prevented, for example such that the first transparent piece requires forcible separation from the second transparent piece rather than allowing the two pieces to be merely pulled apart by hand.

Optionally, at least one of the first and second transparent pieces comprises an ultraviolet coating that protects against ultraviolet degradation. The colour-receiving face of the first transparent piece may comprise the ultraviolet coating and the desired colour is printed onto the colour-receiving face comprising the ultraviolet coating. The ultraviolet coating may be absorbed or fused with the material (e.g. glass) of the underlying surface.

Optionally, the second transparent piece comprises an ultraviolet coating that protects against ultraviolet degradation. The joining face of the second transparent piece may comprise the ultraviolet coating. The ultraviolet coating may be absorbed or fused with the material (e.g. glass) of the underlying surface.

Optionally, the colour-receiving face of the first transparent piece comprises an ultraviolet coating that protects against ultraviolet degradation and the desired colour is printed on the colour-receiving face comprising the ultraviolet coating, and the joining face of the second transparent piece comprises an ultraviolet coating that protects against ultraviolet degradation. The ultraviolet coatings may be absorbed or fused with the material (e.g. glass) of the underlying surfaces.

Optionally, the first transparent piece is permanently affixed to the second transparent piece by an adhesive, optionally an ultraviolet-cured adhesive.

Optionally, the first transparent piece and/or the second transparent piece comprise an optical coating. The colour-receiving face of the first transparent piece and/or the joining face of the second transparent piece may comprise the optical coating.

Optionally, only a single colour is printed on the colour-receiving face of the first transparent piece. Then, the present invention may also extend to a colorimeter comparator disc comprising a holder; such a colorimeter colour standard mounted within the holder, and at least one further such colorimeter colour standard mounted within the holder. The colours of the colorimeter colour standards may form a reference colour scale.

Optionally, multiple desired colours are printed on the colour-receiving face of the first transparent piece thereby providing multiple colorimeter colour standards on a single joined part. Then, the present invention may also extend to a colorimeter comparator disc comprising a holder, and such a single joined part mounted within the holder. The colours of the colorimeter colour standards may form a reference colour scale.

BRIEF DESCRIPTION OF THE DRAWINGS

In order that the invention can be more readily understood, reference will now be made by way of example only, to the accompanying drawings in which:
FIG. 11 is schematic representation showing in greater detail the step of joining the glass pieces to form a colour standard from FIG. 4;
FIG. 12 is a simplified side view of the two glass pieces joined to form a colour standard.

DETAILED DESCRIPTION OF THE INVENTION

Figure 1:
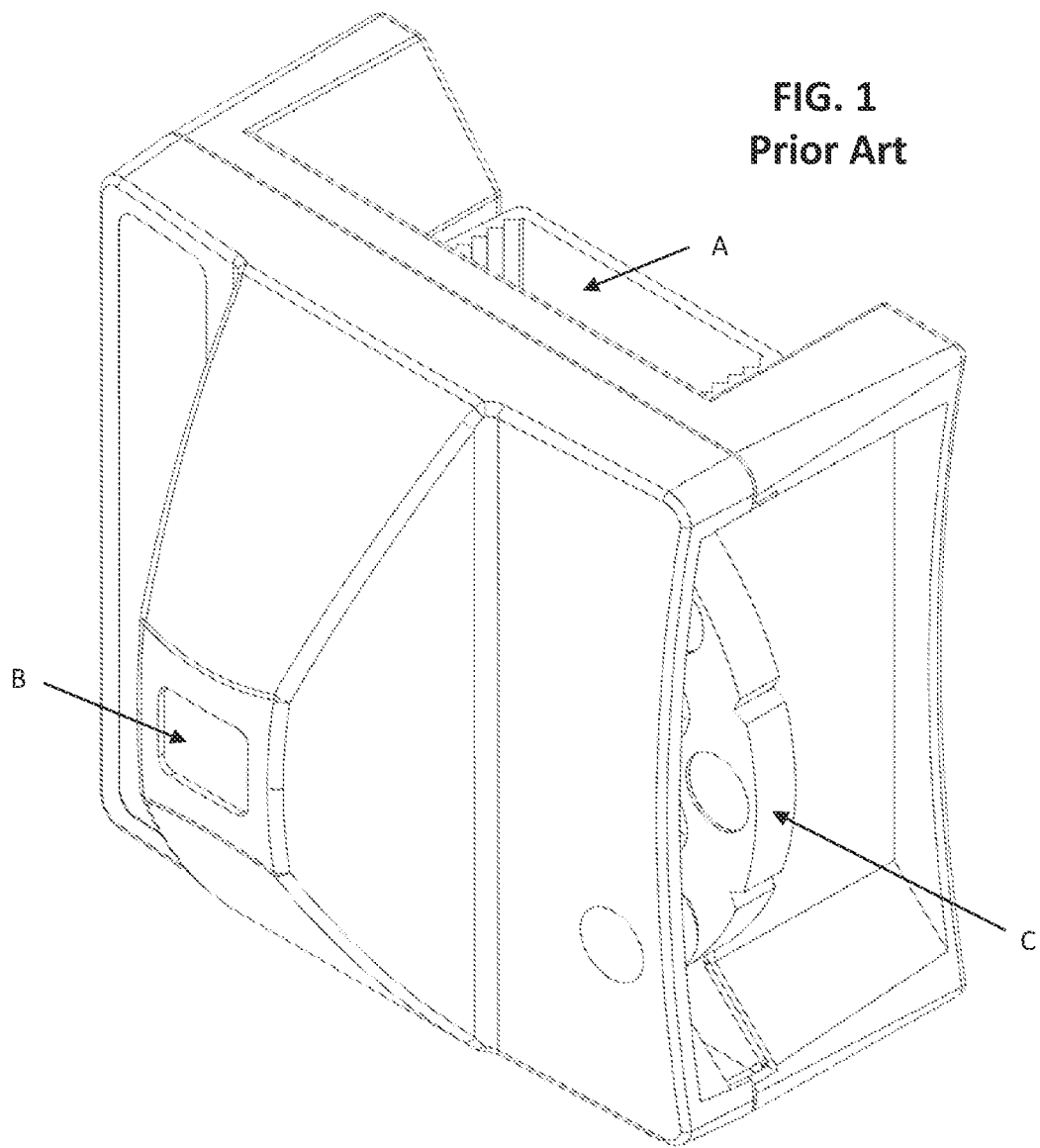
FIG. 1 is an isometric view of a typical colorimeter.
Figure 2:
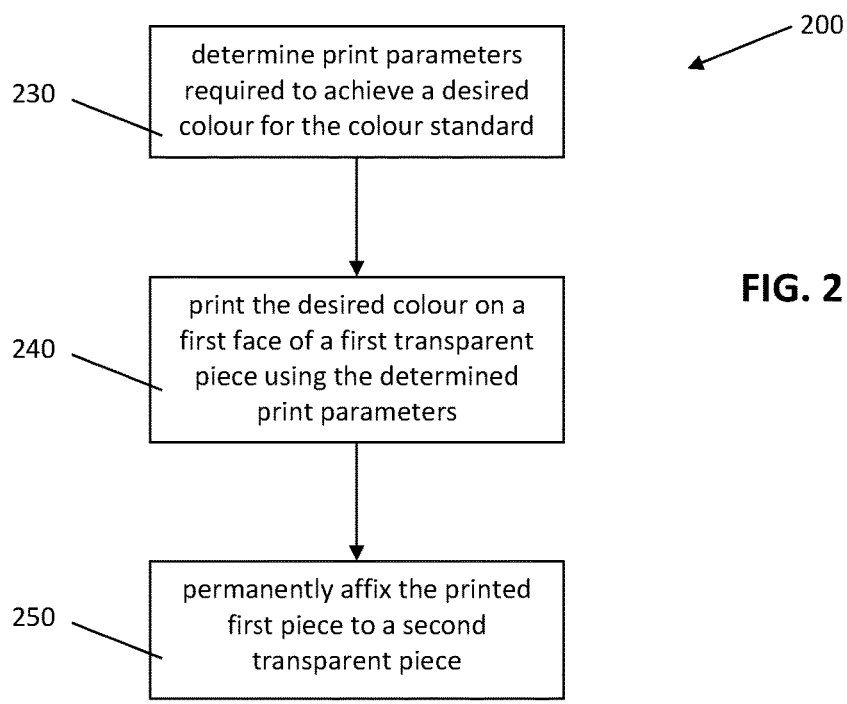
FIG. 2 is a schematic representation of a method of making a colorimeter colour standard.
Figure 3:
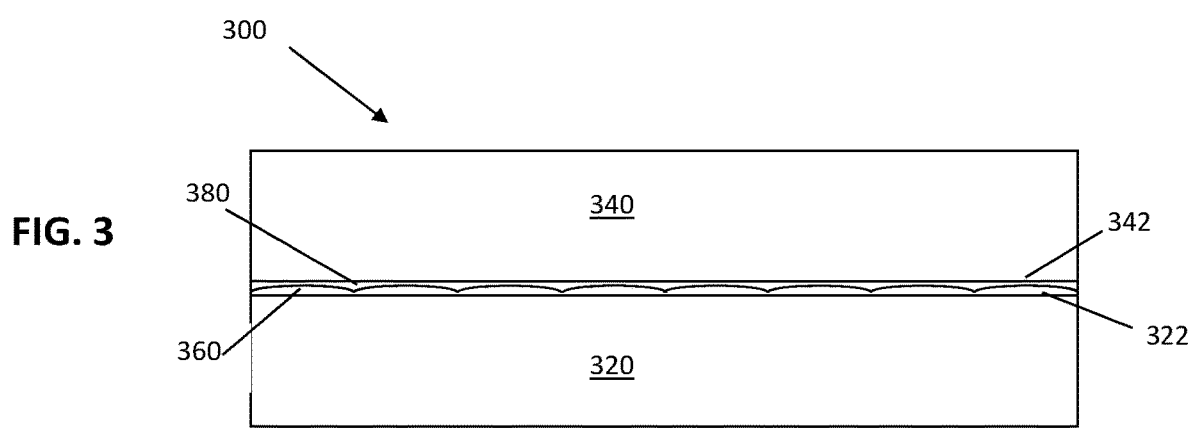
FIG. 3 is a simplified side view of a colorimeter colour standard.

A method 200 of method of making a colorimeter colour standard 300 is shown in FIG. 2 and the resulting colorimeter colour standard 300 is shown in FIG. 3. The method 200 begins at step 230 where print parameters required to achieve a desired colour for the colour standard 300 are determined. The method continues at step 240 where the desired colour is printed on a colour-receiving face 322 of a first transparent piece 320 using the determined print parameters. Finally, at step 250, the first transparent piece 320 is permanently affixed to a second transparent piece 340 such that the colour-receiving face 322 of the first transparent piece 320 and a joining face 342 of the second transparent piece 340 are positioned at the interface between the first transparent piece 320 and the second transparent piece 340.

As shown in FIG. 3, the colour standard 300 comprises the first transparent piece 320 permanently affixed to the second transparent piece 340 with the colour-receiving face 322 and the joining face 342 facing each other at the interface of the two pieces 320, 340, and wherein a desired colour has been printed on the colour-receiving face 322 of the first transparent piece 322. The printed colour can be seen as the printed layer 360 in FIG. 3. In the exemplary embodiment of FIG. 3, the first transparent piece 320 is permanently affixed to the second transparent piece 340 using an adhesive that forms an adhesive layer 380.

Figure 4:
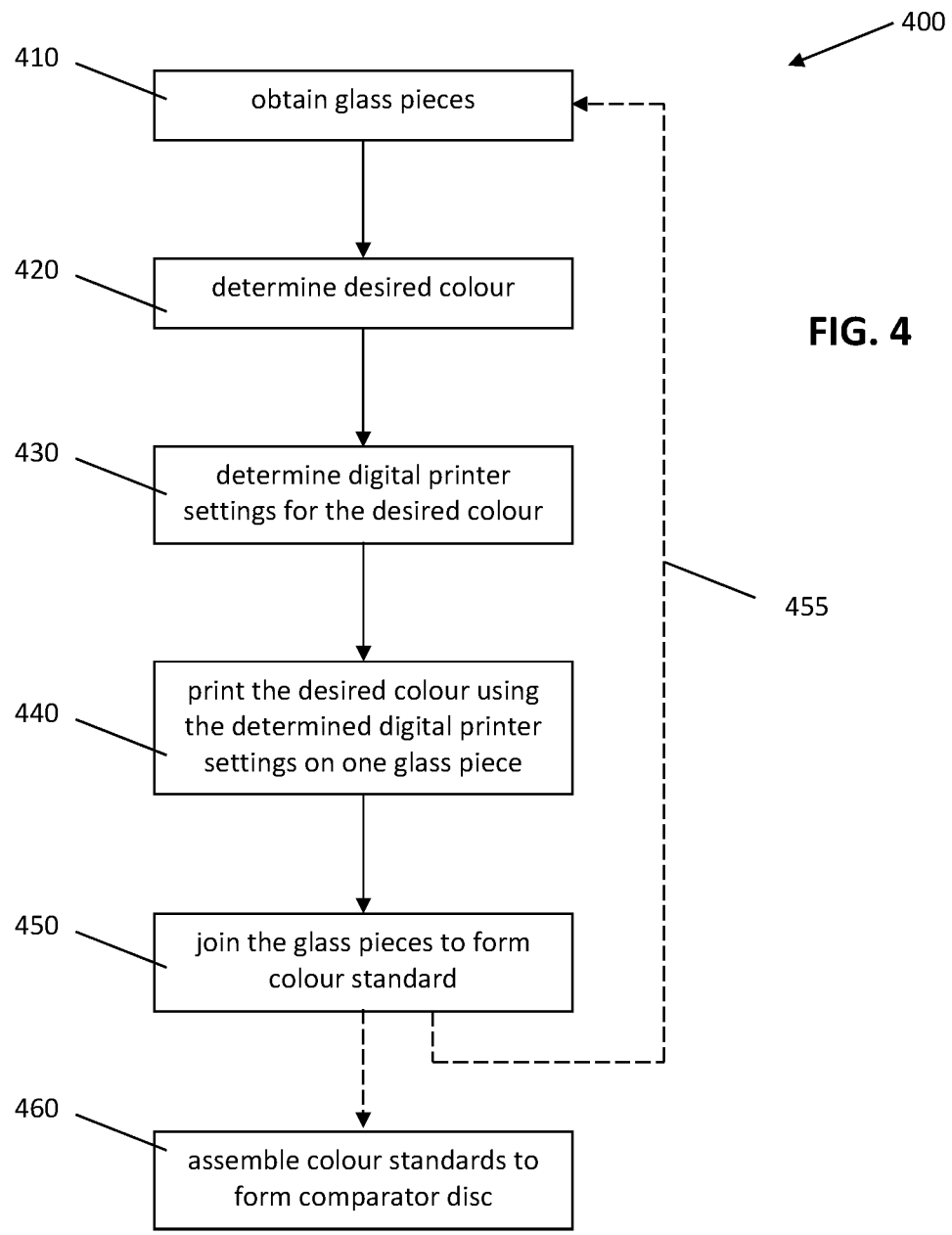
FIG. 4 is a schematic representation of a more detailed method of making a colorimeter colour standard.

A further method 400 of making a colorimeter colour standard 1200 is shown in FIG. 4, and FIG. 12 shows the finished colour standard 1200.

Figure 6:
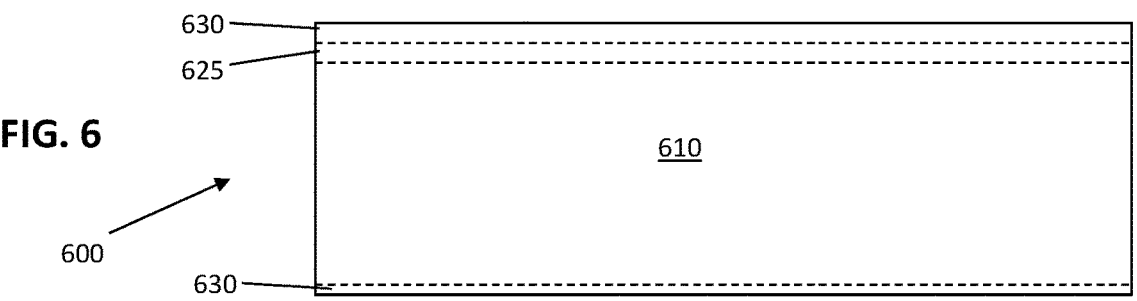
FIG. 6 is a simplified side view of a glass piece.

The method 400 starts at 410 where two transparent pieces 600 like that shown in FIG. 6 are obtained. In this embodiment, the transparent pieces comprise a first glass piece 620 and a second glass piece 640. The first and second glass pieces 620, 640 are identical, within manufacturing tolerances. For example, the first and second glass pieces 620, 640 may be cut from the same sheet of glass so as to have the same size and dimensions. In this example, the first and second glass pieces 620, 640 are flat discs of clear, transparent float glass.

Next, at step 420, the desired colour for the colorimeter colour standard 1200 is determined. Then, at step 430, the digital printer settings required to print the desired colour on the first glass piece 620 are determined. With the printer settings determined at step 430, the method may continue at step 440 by printing the desired colour on the print-receiving face 635 of the first glass piece 620 by operating the digital printer according to the determined printer settings. A print layer 660 is formed that covers the print-receiving face 635 of the first glass piece 620.

Finally, the first and second glass pieces 620, 640 are joined at step 450. This step 450 sees adhesive applied to the print layer 660 to form an adhesive layer 680. The second glass piece 640 is then stacked on the first glass piece 620 with the print layer 660 and adhesive layer 680 sandwiched between the colour-receiving face 622 of the first glass piece 620 and a joining face 642 of the second glass piece 640. The adhesive of the adhesive layer 680 is then allowed to cure such that the first glass piece 620 becomes permanently affixed to the second glass piece 640, thereby forming the colorimeter colour standard 1200.

FIG. 4 also shows further steps for making a colorimeter comparator wheel 1300. As indicated by the loop 455, the method may comprise repeated iterations of steps 420 to 450 such that series of colorimeter colour standards 1200 are produced. A different desired colour may be selected each time step 420 is performed. For example, the desired colours may correspond to the colours of a colour scale such as an industry standard colour scale (e.g. an ASTM colour scale, the EBC scale, the European Pharmacopoeia colour scale, the Gardner Colour scale, the Platinum-Cobalt/Hazen/APHA colour scale, the Saybolt colour scale, the DEHA colour scale or white and yellow indices).

Figure 13:
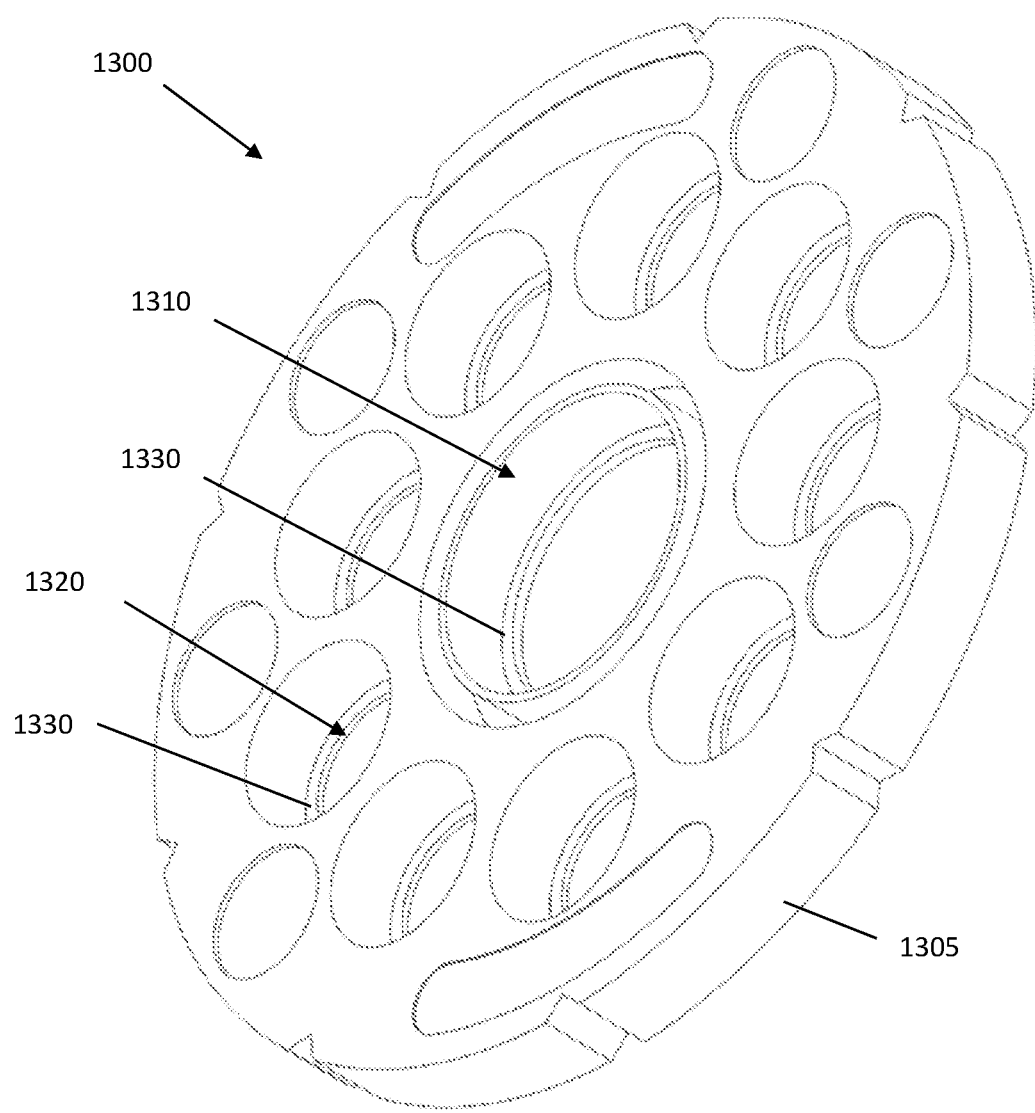
FIG. 13 is an isometric view of a colorimeter comparator disc comprising multiple colour standards like that of FIG. 12.
Figure 14:
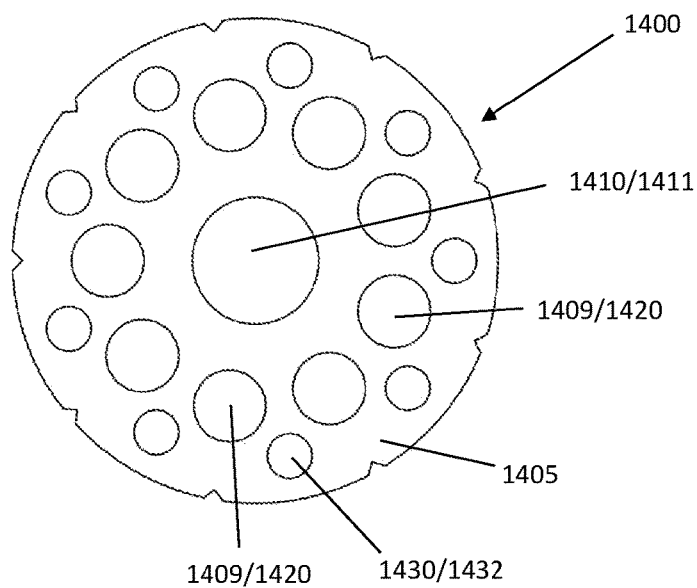
FIG. 14 is a plan view of a colorimeter comparator disc comprising multiple colour standards provided on a single glass disc.

When the series of colorimeter colour standards 1200 are complete, the method may continue to step 460 where the series of colorimeter colour standards 1200 are mounted in a holder 1310 to form a colorimeter comparator wheel 1300, for example like the one shown in FIG. 13.

Figure 5:
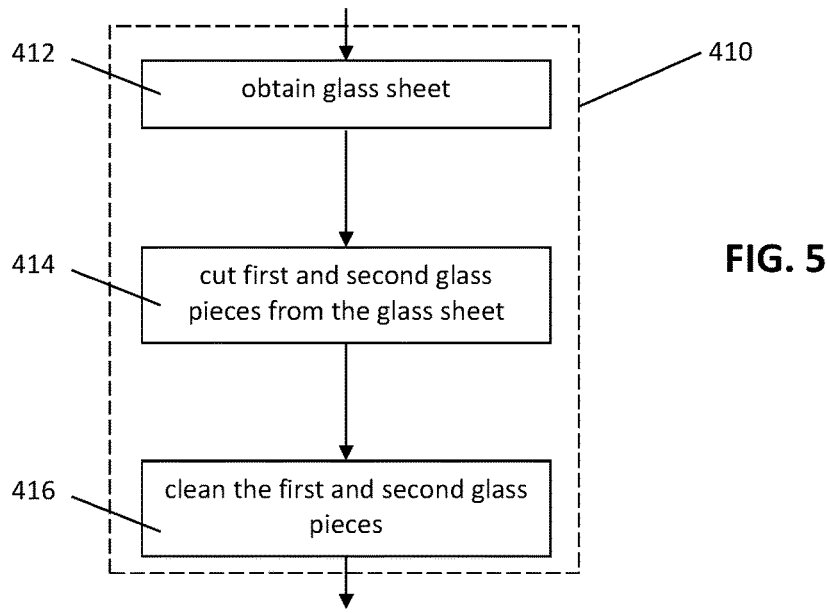
FIG. 5 is a schematic representation showing in greater detail the step of obtaining glass pieces from FIG. 4.

FIG. 5 shows in greater detail step 410 of FIG. 4 that comprises obtaining the first and second glass pieces 620, 640. FIG. 5 starts at step 412 where a glass sheet is obtained. The first and second glass pieces 620, 640 are cut from this glass sheet at step 414. For example, a glass sheet having the desired properties may be purchased or a glass sheet having the desired properties may be made. An example of a cross section of a glass piece 600 (either the first glass piece 620 or the second glass piece 640) according to one embodiment of the invention is shown in FIG. 6, which of course reflects the cross section of the glass sheet from which it is cut.

Each glass piece 600 comprises a core 610 of clear, transparent glass which, in this embodiment, is produced using the float glass method. Further coatings are provided for the glass piece 600. Namely, an ultraviolet (UV) coating 625 is applied to one side of the glass core 610. Then optical coatings 630 are applied to both sides of the glass piece 600, namely applied to the side already treated with the UV coating 625 and also the reverse side of the glass core 610. The UV coating 625 provides protection from UV degradation, i.e. acts as a filter that absorbs UV radiation to reduce the amount of UV radiation passing through the glass piece 600 that may then degrade any material behind or printed on the other side of the glass piece 600. The optical coatings 630 enhance the optical properties of the glass piece 600, for example by minimising the reflectance of the glass piece 600. The coatings 625, 630 may be merely applied to the surfaces of the glass core 610 of the glass sheet (either before or after the glass pieces 600 are cut from the glass sheet) or may be further treated to combine with the glass material of the glass core 610, for example by heating or baking the glass sheet or glass pieces 600 with one or more coatings 625, 630 applied. The boundaries between the glass core 610 and the coatings 625, 630 are shown as dotted lines in FIG. 6 to indicate that there may not be a sharp boundary, for example because baking the glass sheet or glass pieces 600 may cause the coating material to diffuse into the glass core 610 or into an adjacent coating. An example of a suitable glass sheet is Museum Glass® produced by Tru Vue Inc.® of McCook, Illinois 60525, USA.

As noted above, step 414 comprises cutting the glass pieces 600 from the glass sheet, and the glass pieces 600 are cut to be the same size. The glass pieces 600 may be cut from the glass sheet using any known technique, such as by cutting with a hollow drill bit, water jet cutting or laser cutting. Persons skilled in the art will appreciate that step 414 may be omitted in some embodiments, for example where glass pieces 600 of the required size and quality may be purchased.

FIG. 5 finishes with step 416 where the glass pieces 600 are cleaned and/or polished. The finished glass pieces 600 are typically 0.5 mm to 5 mm thick, for example 2.5 mm or approximately 2.5 mm thick. As will be appreciated, the thicknesses of the glass core 610 and coatings 625, 630 are not shown to scale in FIG. 6 as the coatings 625, 630 will be much thinner relative to the glass core 610.

Figure 7:
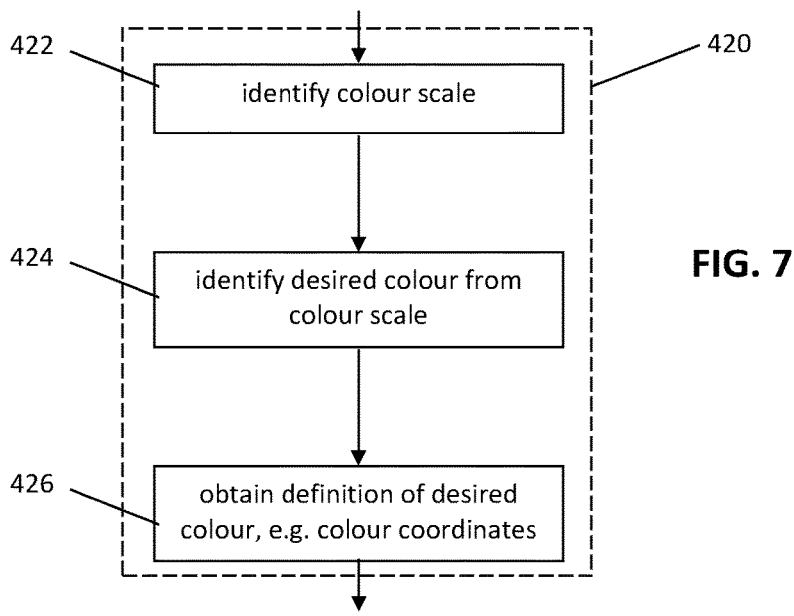
FIG. 7 is a schematic representation showing in greater detail the step of determining a desired colour from FIG. 4.

FIG. 7 shows in more detail step 420 of FIG. 4 that comprises determining a desired colour for the colour standard 1200. In this embodiment, step 422 first sees an industrial colour scale identified like those described above. For example, a colour scale may be identified according to the purpose of a colour comparison to be performed, such as to grade a beer. Then, at step 424, a desired colour is identified from the colour scale. At step 426, a definition of the desired colour is obtained. For example, step 426 may comprise obtaining colour coordinates of the desired colour. The colour coordinates may be obtained from a look-up table or similar. The colour co-ordinates may define the colour in a colour space, for example in this exemplary embodiment the colour coordinates are expressed in L*a*b colour space. Generally, colours will be defined using an additive colour space.

Step 420 need not require using an industry standard colour scale. For example, a colour scale may be derived from samples. Samples may be prepared with controlled variations of dilution or age or exposure to light (and other radiation). The colour of each sample may then be measured, for example using a spectrometer to obtain colour coordinates for that sample.

Figure 8:
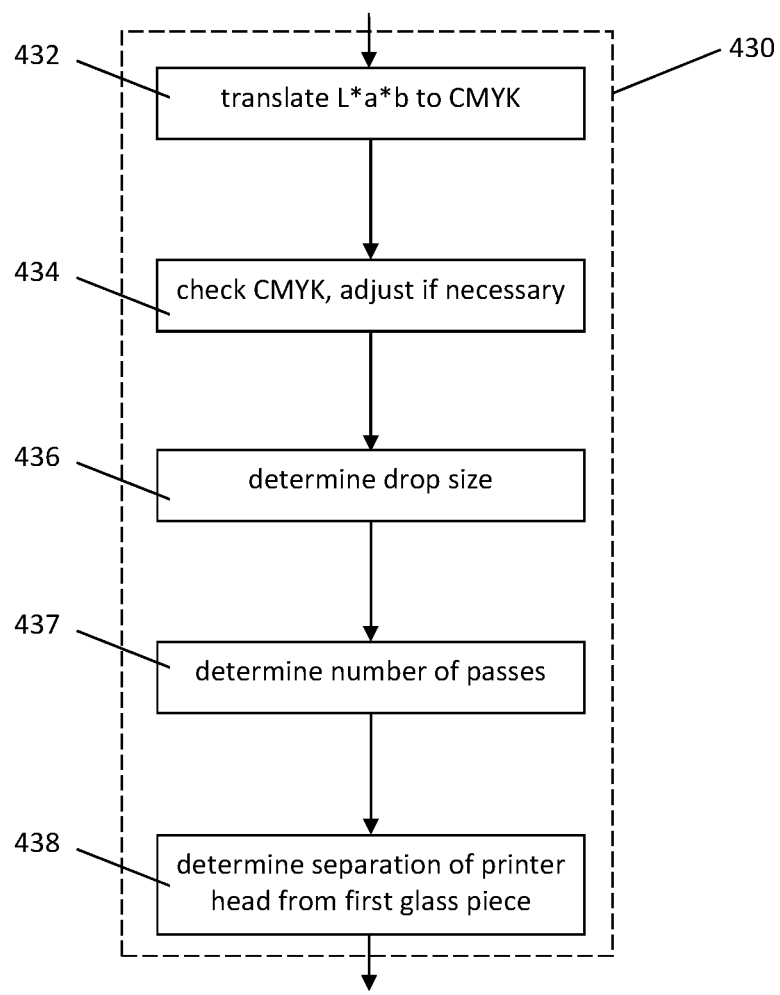
FIG. 8 is a schematic representation showing in greater detail the step of determining digital printer settings for the desired colour from FIG. 4.

FIG. 8 shows in more detail step 430 of FIG. 4 that comprises determining digital printer settings to print the desired colour. Many different types of digital printer may be used, for example a Mimaki® UJF-3042 MkII or Mimaki® UJF-6042 MkII LED UV digital printer available from Mimaki Europe B.V., Stammerdijk 7E,1112 AA Diemen, The Netherlands. FIG. 8 starts at 432 where the L*a*b* colour coordinates of the desired colour produced at step 426 are translated into CMYK values. Other subtractive colour schemes may be used. Generally, step 432 will comprise a translation of the colour coordinates of the desired colour from an additive colour space to a subtractive colour space so as to be suitable for a printer. Software packages that perform such translations are readily available, for example Adobe's Photoshop®. The CMYK values set the relative amounts of cyan, magenta, yellow and black inks to be mixed by the digital printer prior to delivery through a print head of the printer.

At step 434, the CMYK values produced at step 432 are checked and adjusted if necessary. In this embodiment, a threshold is applied to each CMYK value and, if the value is below the threshold, that value is reset to zero. This prevents the digital printer from attempting to print colours where colour control becomes difficult due to very low fractions of a particular ink colour being required. The threshold values may be set through trial and error for example, or may be defined by the manufacturer of the digital printer. Step 434 may be omitted.

Correct setting of the CMYK values will help in achieving the desired colour for the colour standard 1200, although further digital printer settings may be required as will now be explained.

At step 436, the ink drop size to be used is determined based on the CMYK values. This is the size of the ink drop delivered by the print head after the individual cyan, magenta, yellow and black inks have mixed. Variations in drop size will affect the smoothness and hence uniformity of the print layer 660 produced.

At step 437, the number of printing passes the print head will make over the first glass piece 620 is determined based on the CMYK values. Variations in the number of passes made will affect the smoothness and hence uniformity of the print layer 660 produced. In addition, an offset may be determined. That is, digital printers often print as a series of spots, each spot corresponding to delivery of an ink drop at a particular location on the substrate (the first glass piece 620 in this embodiment). Printing in the same locations during each pass tends to exaggerate lack of uniformity as the centre point of each spot will be thickest and the common centre points become additive. However, creating an offset in the locations between passes will increase surface uniformity, for example by using an offset of half the separation between spots. Also, the number of passes will affect the density of the colour produced, with more passes producing more dense colours.

The number of passes determined at step 437 will be influenced by the ink drop size determined at step 436. Namely, the larger the ink drop size, the fewer the number of passes required. Hence, steps 436 and 437 may be performed at the same time such that the ink drop size and number of passes are set together.

At step 438, the separation of the printer head from the first glass piece 620 is determined. The digital printer tends to spray the ink drop from the printer head such that a cone of ink is produced. This means that the greater the separation of the printer head from the first glass piece 620, the larger the spot size produced on the first glass piece 620.

The separation determined at step 438 will be influenced by the ink drop size determined at step 436 and the number of passes determined at step 437. For example, a greater separation will lead to a less dense colour suggesting a compensatory increase in the number of passes or in the size of the ink drop.

The optimum combination of ink drop size determined at step 436, number of passes determined at step 437 and separation determined at step 438 for a given desired colour and its CMYK values can be found as a matter of trial and error. The results may be stored in a look-up table that relates the CMYK values to ink drop size, number of passes (and offset), and separation of the printer head from the first glass piece 620. Then, a suitably programmed computer may be used to perform step 430. For example, the computer may receive the definition of the desired colour in L*a*b coordinates and may translate this into CMYK values by performing step 432 using a look-up table. Having obtained the CMYK values for the desired colour, the computer may perform steps 436, 437 and 438 by identifying the CMYK values in another (or the same) look-up table and retrieving the stored ink drop size, number of passes (and offset), and separation against those CMYK values. The computer may then produce an output file specifying these digital printer settings at the end of step 430. This output file may then be used to operate the digital printer, for example by passing the output file to a printer driver associated with the digital printer.

Figure 9:
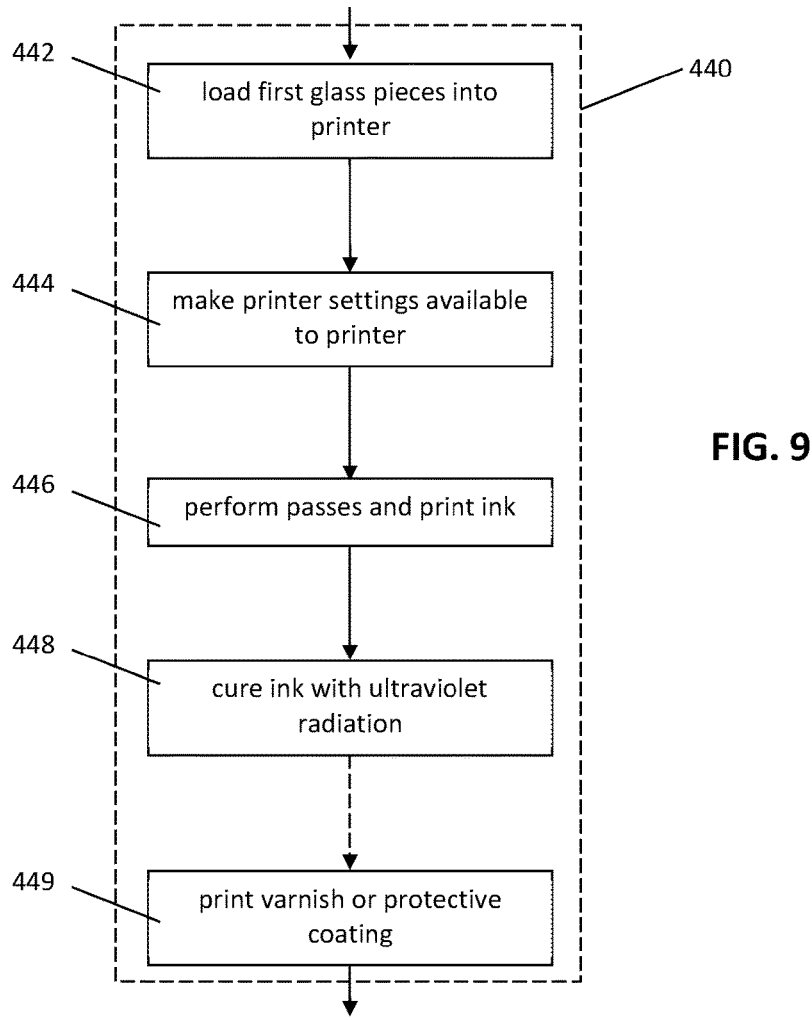
FIG. 9 is a schematic representation showing in greater detail the step of printing the desired colour using the determined digital printer settings on one glass piece from FIG. 4.

FIG. 9 shows in more detail step 440 of FIG. 4 that comprises printing the desired colour using the determined digital print settings on the first glass piece 620. At step 442, the first glass piece 620 is loaded into the digital printer with the print-receiving face 635 facing the printer head. Then, at step 444, the printer settings are made available to the printer such that the printer can print on the first glass piece 620. Optionally, the printer may be used to apply a primer to the print-receiving face 635 before the ink is printed at step 446.

Figure 10:
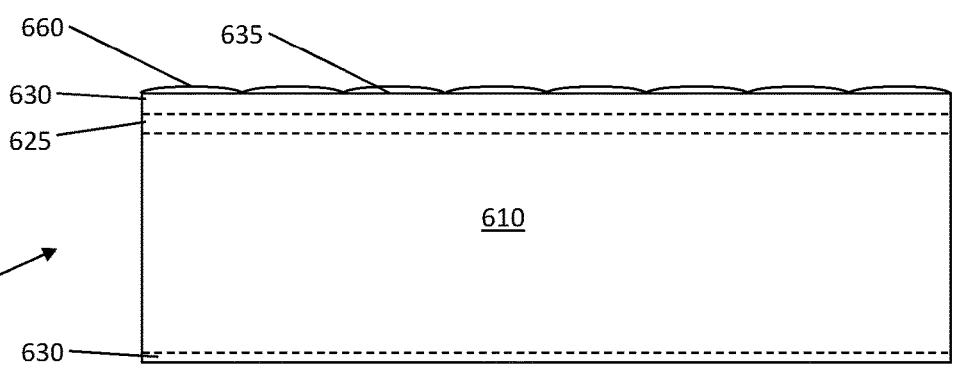
FIG. 10 is a simplified side view of a glass piece with a printed layer.

At step 446, the printer uses the printer settings to perform the specified number of passes over the first glass piece 620 and print the desired colour onto the print-receiving face 635 of the first glass piece 620 to cover the print-receiving face 635. The print-receiving face 635 of the first glass piece 620 is the optical coating 630 adjacent the ultraviolet coating 625. FIG. 10 shows a cross sectional view of the first glass piece 620 to show the layers corresponding to the glass core 610, the ultraviolet coating 625, the optical coatings 630 and the print layer 660.

The digital printer delivers an ultraviolet curable ink, such that step 448 sees the printer illuminate the print layer 660 with ultraviolet radiation to cure the ink. A suitable choice of ink is the LH100 range available from Mimaki Europe B.V., Stammerdijk 7E, 1112 AA Diemen, The Netherlands, which offer good scratch and chemical resistance.

FIG. 9 also shows a final, optional step 449 where the digital printer may be used to print a varnish or protective coating onto the print layer 660.

FIG. 11 shows in more detail step 450 of FIG. 4 that comprises joining the first and second glass pieces 620, 640 to form the colorimeter colour standard 1200. Step 451 sees the second (unprinted) glass piece 640 taken and checked for cleanliness (and cleaned again, if necessary). Step 452 sees the first (printed) glass piece 620 taken and cleaned to ensure that the print layer 660 is clean and free from dust and other contaminants. Step 453 sees a liquid adhesive applied to the print layer 660. The liquid adhesive will flow to form an adhesive layer 680 above the print layer 660. Furthermore, as noted above, the print layer 660 may not be completely smooth due to the digital printer printing as a series of spots. The liquid adhesive will flow into the thinner sections of the printed layer 660 such that the upper surface of the adhesive layer is flat 680. If needed, a scraper or similar may be used to spread the adhesive over the printed layer 660 and to ensure a smooth finish is achieved.

At step 454, the second glass piece 640 is offered up to the first glass piece 620 such the joining face 637 is pushed against the adhesive layer 680. The joining face 637 is the face on the side of the second glass piece 640 having the ultraviolet coating 625. The resulting sequence of layers of the first and second glass pieces 620, 640 is shown in FIG. 12.

An ultraviolet curable adhesive is used, so that step 455 sees the joined glass pieces 620, 640 illuminated with ultraviolet radiation. The adhesive layer 680 is illuminated from the side having the second glass piece 640 such that the ultraviolet radiation does not need to pass through the print layer 660 to get to the adhesive layer 680, thereby reducing exposure of the print layer 660 to the ultraviolet radiation. When the adhesive layer 680 is dried, the colorimeter colour standard 1200 having the desired colour is formed. The assembled colorimeter colour standard 1200 may be cleaned prior to being used in a colorimeter.

The colorimeter colour standard 1200 may be included in a colorimeter comparator disc 1300. Such a comparator disc 1300 is shown in FIG. 13 although, for the purposes of clarity, the comparator disc 1300 is shown without the colour standards 1200 installed. The colorimeter comparator disc 1300 may comprise a circular annular disc-like holder 1305 through which a relatively large central circular aperture 1310 extends. A series of relatively small circular apertures 1320 extend through the holder 1305, and are equally spaced around the holder 1305 and positioned approximately midway between the edge of the central circular aperture 1310 and the outer edge of the holder 1305. Each aperture 1310, 1320 comprises a flange 1330 at the base of the aperture 1310, 1320.

The central aperture 1310 receives a correspondingly-sized clear circular glass disc (not shown) that sits on the flange 1330 and is held in place by a circular spring (not shown). The clear glass disc provides a viewing window through which the sample being tested may be viewed in the colorimeter. The clear glass disc may be made from float glass and may be provided with one or more optical coatings and one or more ultraviolet coatings.

The series of a relatively small circular apertures 1320 receives a series of colour standards 1200 like the one shown in FIG. 12, each of the colour standards 1200 having one of the colours of a colour scale. Each colour standard 1200 is the same size as the apertures 1320 such that each colour standard 1200 sits on a flange 1330 and is held in place by a circular spring (not shown).

FIGS. 14 to 18 show an alternative embodiment of a colorimeter comparator disc 1400. The colorimeter comparator disc 1400 may comprise a circular disc-like holder 1405 comprising a halves 1406 which join together to sandwich a single circular glass disc 1407 therebetween, with the join of the halves 1406 extending around the periphery 1404 of the glass disc 1407. A series of colour standards 1409 are equally spaced around the comparator disc 1400. The colour standards 1409 are printed onto the single circular glass disc 1407 and are visible through circular apertures 1420 provided in each half 1406 of the holder 1405. There is also a relatively large central circular aperture 1410 that opens onto a clear central portion 1411 of the single circular glass disc 1407 through which the sample being tested may be viewed in the colorimeter.

Figure 15:
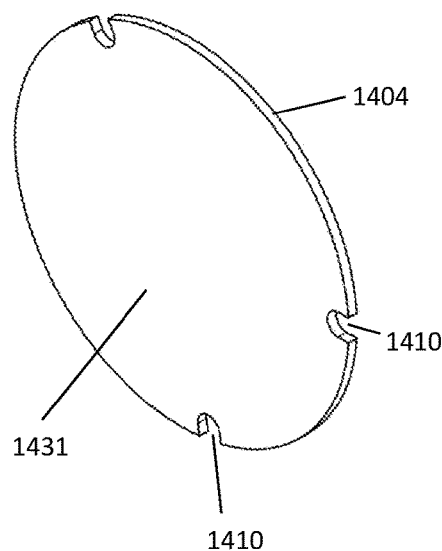
FIG. 15 is an isometric view of a glass piece used to form the glass disc of the comparator disc of FIG. 14.

The glass disc 1407 bearing multiple colour standards 1409 is made broadly as described above with respect to the colour standards 1200. Referring back to FIG. 4, step 410, two glass pieces 1431 like those described previously are obtained, although the glass pieces 1431 will be of a larger size. The larger size of the glass pieces 1431 may alter the choice of how to cut the pieces 1431 from the glass sheet. For example, cutting with a hollow drill bit may be less suitable although water jet cutting and laser cutting are likely to remain as good options. FIG. 15 shows one of a pair of glass pieces 1431 from which the single circular glass disc 1407 is formed. The pair of glass pieces 1431 each include three cut-outs 1410 that extend inwardly from the periphery of the disc 1407. The purpose of these cut-outs 1410 is described below.

Determining a desired colour at step 420 may remain the same other than repeating step 420 via loop 455 will be performed in respect of a single first glass piece 1431. Determining digital printer settings for each desired colour at step 430 may also remain the same. Print co-ordinates will be required to specify the location, size and shape of the area to be printed. Where individual colour standards 1200 are being printed, the first glass pieces 620 are likely to be mounted in the same position on the printer such that the areas to be printed will have the same location, size and shape for each printing step 440. In contrast, for multiple colour standards 1409 on a single glass disc 1407, each colour standard 1409 may have the same size and shape, but will have a different location.

The order of steps 420, 430 and 440 may be varied as the multiple colour standards 1409 are processed. For example, each of steps 420 and 430 may be completed for all colour standards before the next of steps 430 and 440 are started (i.e. all desired colours are determined at step 420 before any printer settings are determined). Alternatively, all of steps 420, 430 and 440 may be performed for a desired colour before steps 420, 430 and 440 are repeated for the next desired colour. Other combinations are possible. For example, steps 420 and 430 may be performed for a desired colour before being repeated for each subsequent desired colour and, when all desired colours have been processed in this way, step 440 may be performed to print each of the desired colour.

Figure 16:
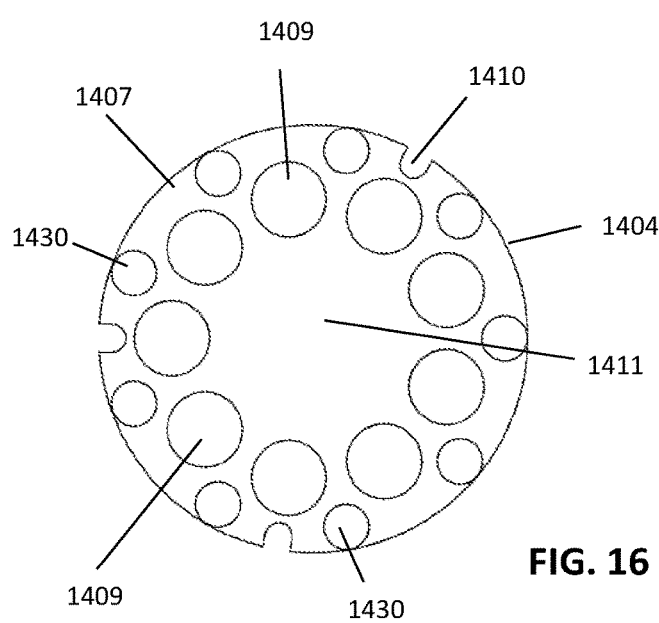
FIG. 16 is a plan view of the single glass disc showing the multiple colour standards provided thereon.

FIG. 16 shows a glass disc 1407 bearing the colour standards 1409. A further set of circles 1430 are also shown in FIG. 16. These circles may contain printed information, for example identifying a colour of one of the standards 1409. The three cut-outs 1410 can also be seen.

Once all colour standards 1409 have been printed, the two glass pieces 1431 may be joined at step 450 in the same way as was described before. Liquid adhesive may be applied to all of one side of a glass piece 1431 or may be applied to only part of a glass piece 1431. For example, liquid adhesive may be applied to at least all of the printed colours to gain the advantage of the adhesive layer 680 filling thin sections in the print layer 660.

Figure 18:
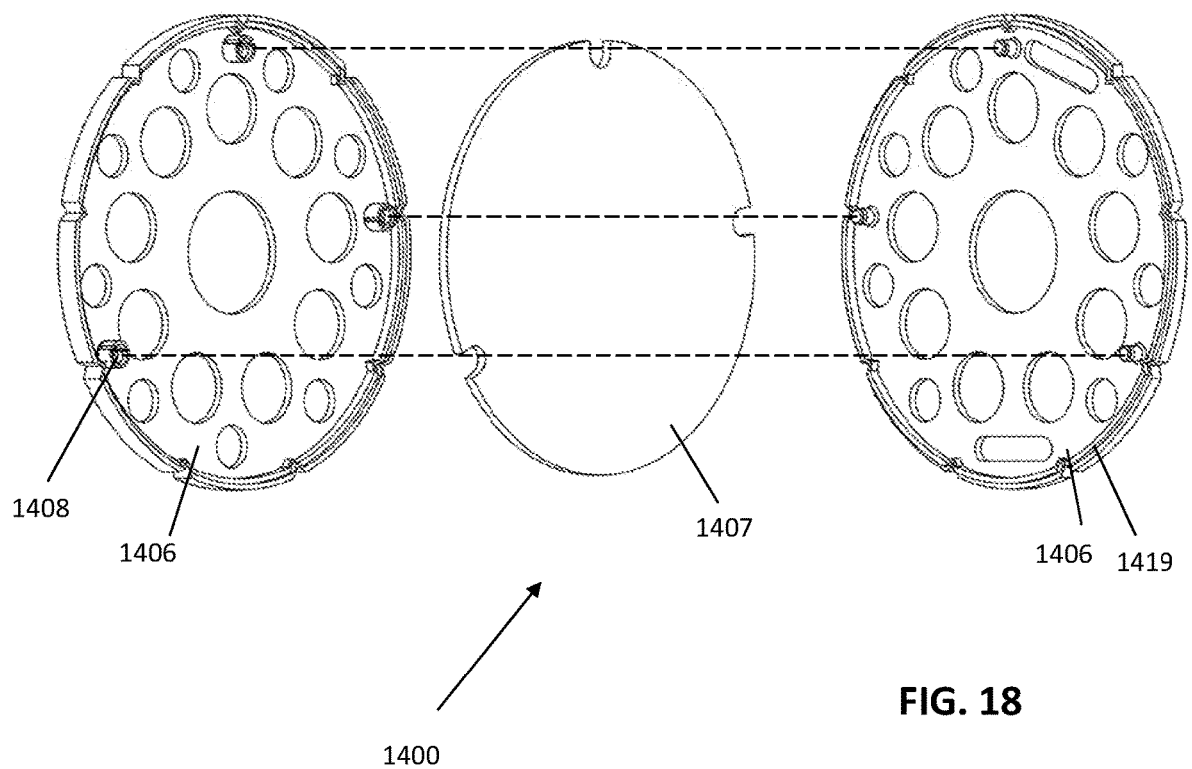
FIG. 18 is a side perspective exploded view of the comparator disc of FIG. 14 that shows the glass disc and the two halves of the holder, with one half rotated about its vertical axis to show its inner face.

Step 460 sees the glass disc 1407 bearing the colour standards 1409 assembled into the comparator disc 1400 by joining the two halves 1406 of the holder 1405 together with the glass disc 1407 held therebetween, as best seen in FIG. 18.

Figure 17:
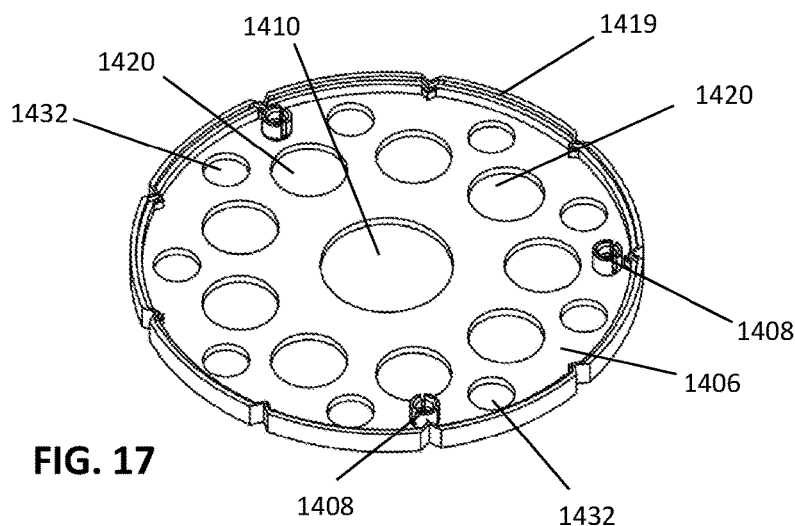
FIG. 17 is an isometric view of a half of the holder of the comparator disc of FIG. 14.

FIG. 17 shows one half 1406 of the holder 1405. The other half 1406 has a complementary configuration. FIG. 17 shows the circular apertures 1420 through which the colour standards 1409 are viewed, and also the central circular aperture 1410. Each half 1406 is also provided with three snap fittings 1408 that co-operate to allow the two halves 1406 to be joined, as best seen in FIG. 18. The three cut-outs 1410 provided in the glass disc 1407 are sized and positioned to accommodate the snap fittings 1408. The snap fittings 1408 and cut-outs 1410 are not equally spaced around the holder 1405 and disc 1407 such that the disc 1407 is held in the holder 1405 in a unique orientation. When joined, a peripheral rim 1419 of one half 1406 meet to define an outer edge of the comparator disc 1400. The rim 1419 and snap fittings 1408 retain and align the glass disc 1407 within the comparator disc 1400.

When assembled, the glass disc 1407 is held snugly between the two halves 1406, and also retained in place by the snap fittings 1408 and the rim 1419. The series of relatively small circular apertures 1420 provided in the halves 1406 align with the colour standards 1409 provided on the glass disc 1407. A further set of apertures 1432 provided in the halves 1406 of the holder 1405 align with the circles 1430 shown in FIG. 16 that may contain printed labels, as described above.

A person skilled in the art will appreciate that the above embodiments may be varied in many different respects without departing from the scope of the appended claims.

For example, a preferred order of layers is described above and illustrated in FIG. 12. This order is preferred primarily as it ensures the UV coating 625 and the ink layer 660 are protected within the colour standard 1200 and less susceptible to damage from scratching. However, other sequences of the layers are possible. For example, the UV coatings 625 may be placed on the outer sides of the colour standards 1200.

In addition, more or fewer layers may be provided. For example, both the first glass piece 620 and the second glass piece 640 may be printed to provide a pair of print layers 660. Then either or both the first and second glass pieces 620, 640 may receive the liquid adhesive. The UV and optical coatings 625, 630 are optional and may be omitted. Also, only a single optical coating per glass piece 600 may be provided, or two UV coatings 625 may be provided with one on each side of a glass piece 600.

Although glass pieces 600 are described above, other forms of transparent pieces 320, 340 may be used. For example, clear plastic pieces such as acrylic pieces may be used.

Colour values other than CMYK may be used for the printing steps (e.g. steps 430 and 440. For example, modified CMYK values might be used. The Minnaki® UJF-3042 MkII printer mentioned above also prints with white ink, and the Minnaki® UJF-6042 MkII printer mentioned above prints with cyan, light cyan, magenta, light magenta, yellow, black and white inks. Hence, other relative fractions of the ink to be used other than just CMYK may be required.

The invention claimed is:

1. A method of making a colorimeter colour standard, comprising:
   determining print parameters required to achieve a target colour for the colour standard;
   printing the target colour on a colour-receiving face of a first transparent piece using the determined print parameters; and
   permanently affixing the first transparent piece to a second transparent piece after printing the target colour on the colour-receiving face such that the colour-receiving face of the first transparent piece and a joining face of the second transparent piece are positioned at an interface between the first transparent piece and the second transparent piece,
   wherein at least one of the first transparent piece and the second transparent piece comprises an ultraviolet coating that protects against ultraviolet degradation.

2. The method of claim 1, wherein:
   the determining the print parameters required to achieve the target colour for the standard comprises determining printer settings of a digital printer to achieve the target colour, and the printing the target colour on the colour-receiving face of the first transparent piece comprises operating the digital printer according to the determined printer settings; and
   the method further comprises obtaining colour co-ordinates of the target colour in a colour scale other than CMYK, converting the colour co-ordinates into equivalent CMYK colour co-ordinates and using the CMYK colour co-ordinates to determine relative amounts of cyan, magenta, yellow and black inks to use in the printing the target colour on the colour-receiving face of the first transparent piece.

3. The method of claim 2, wherein the method further comprises determining one of more or the following printer settings required to achieve the target colour: ink drop size; separation distance of a printer head from the colour-receiving face of the first transparent piece; and number of passes of the printer head over the colour-receiving face of the first transparent piece.

4. The method of claim 1, wherein printing the target colour on the colour-receiving face of the first transparent piece comprises printing an ultraviolet curable ink, and the method further comprises using ultraviolet irradiation to cure the printed ink.

5. The method of claim 1, wherein permanently affixing the first transparent piece to the second transparent piece comprises:
   applying a liquid adhesive to the printed colour-receiving face of the first transparent piece, wherein the liquid adhesive is an ultraviolet curable adhesive;
   joining the colour-receiving face of the first transparent piece to the joining face of the second transparent piece; and
   using ultraviolet radiation to cure the adhesive.

6. A method of making multiple colorimeter colour standards, comprising:
   the method of claim 1;
   one or more further steps of determining print parameters required to achieve a further target colour, different from other target colour(s), and printing the further target colour on a face of the first transparent piece or on a face of a different transparent piece; and
   either:
   printing each further target colour on an unprinted portion of the colour-receiving face of the first transparent piece, and then permanently affixing the printed first transparent piece to the second transparent piece such that the colour-receiving face abuts against the joining face of the second transparent piece, thereby providing multiple colour standards on a single joined part;
   or
   printing each further target colour on a colour-receiving face of the different transparent piece, and then permanently affixing each different transparent piece to another transparent piece such that each colour receiving face abuts against a joining face of the another transparent piece thereby providing multiple colour standards.

7. The method of claim 6, wherein the colours of the colour standards form a reference colour scale.

8. The method of claim 1, wherein the colour-receiving face of the first transparent piece comprises the ultraviolet coating and the target colour is printed onto the colour-receiving face comprising the ultraviolet coating.

9. A colorimeter colour standard comprising a first transparent piece permanently affixed to a second transparent piece such that a colour-receiving face of the first transparent piece and a joining face of the second transparent piece are positioned at an interface between the first transparent piece and the second transparent piece, wherein the colour-receiving face of the first transparent piece bears a target colour, and wherein at least one of the first transparent piece and the second transparent piece comprises an ultraviolet coating that protects against ultraviolet degradation.

10. The colorimeter colour standard of claim 9, wherein only a single colour has been printed on the colour-receiving face of the first transparent piece.

11. A colorimeter comparator disc comprising:
a holder;
a colorimeter colour standard according to claim 10 mounted within the holder; and
at least one further colorimeter colour standard mounted within the holder.

12. The colorimeter comparator disc of claim 11, wherein the colours of the colour standards form a reference colour scale.

13. The colorimeter colour standard of claim 9, wherein multiple target colours are printed on the colour-receiving face of the first transparent piece thereby providing multiple colorimeter colour standards on a single joined part.

14. A colorimeter comparator disc comprising:
a holder; and
a colorimeter colour standard according to claim 13 mounted within the holder.

15. The colorimeter colour standard of claim 9, wherein the colour-receiving face of the first transparent piece comprises the ultraviolet coating and the target colour has been printed onto the colour-receiving face comprising the ultraviolet coating.

16. The colorimeter colour standard of claim 15, wherein only a single colour has been printed on the colour-receiving face of the first transparent piece.

* * * * *